United States Patent [19]

Lindsey

[11] 4,301,994
[45] Nov. 24, 1981

[54] BUNDLE CONDUCTOR STRINGING BLOCK

[75] Inventor: L. E. Lindsey, Pasadena, Calif.

[73] Assignee: Lindsey Manufacturing Co., Azusa, Calif.

[21] Appl. No.: 118,115

[22] Filed: Feb. 4, 1980

[51] Int. Cl.³ .............................................. B66D 1/36
[52] U.S. Cl. ........................... 254/134.3 PA; 254/393; 254/405
[58] Field of Search ............... 254/134.3 PA, 134.3 R, 254/393, 405

[56] References Cited

U.S. PATENT DOCUMENTS

| 3,905,581 | 9/1975 | Chadwick | 254/393 |
| 4,018,422 | 4/1977 | Bozeman | 254/134.3 PA |
| 4,129,287 | 12/1978 | Lindsey | 254/134.3 PA |

Primary Examiner—Robert C. Watson
Attorney, Agent, or Firm—Sellers and Brace

[57] ABSTRACT

An improved bundle conductor stringing block having a main frame constructed essentially of structural steel components and including a cantilever suspension yoke positioned to form a tow-line receiving passage through which a helicopter can dispense a conductor tow-line onto a central one of multiple sheaves. Guide members pivoted to the opposite sides of the tow-line passage guide the tow-line onto the central sheave and include toggle spring device engageable by a running board at the trailing end of the tow-line to engage these members and pivot them in either direction to retracted positions along the block side frame.

14 Claims, 3 Drawing Figures

U.S. Patent  Nov. 24, 1981  Sheet 1 of 2  4,301,994
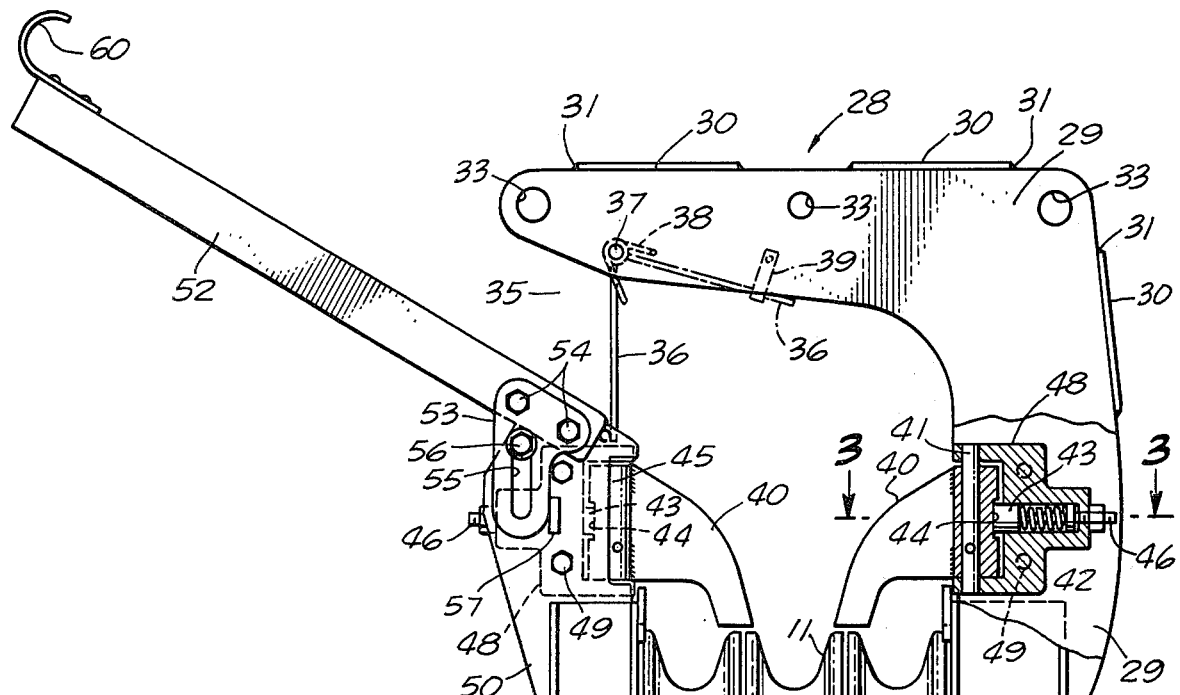
FIG. 1.
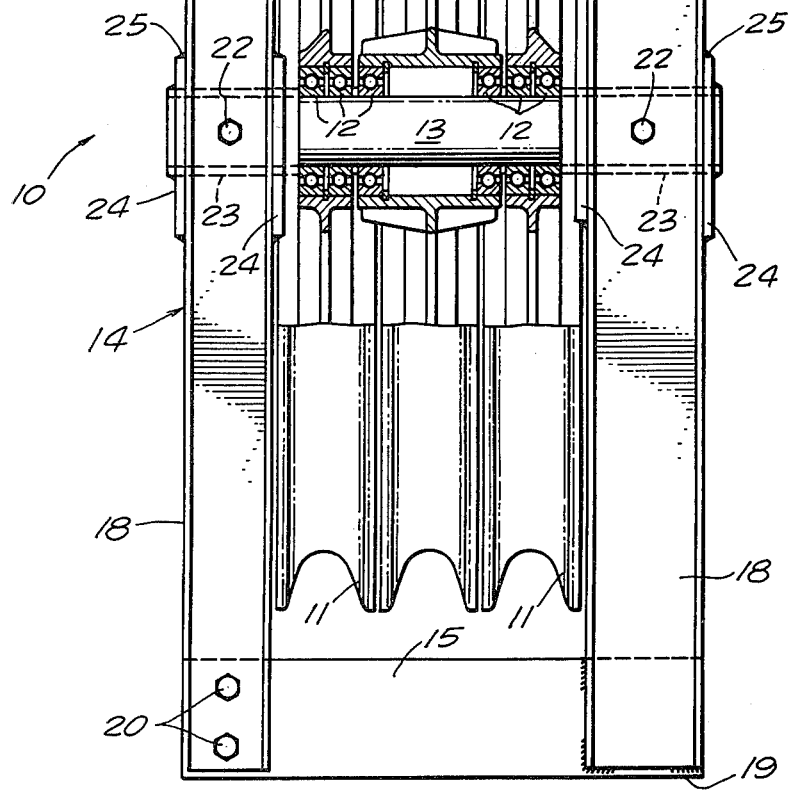

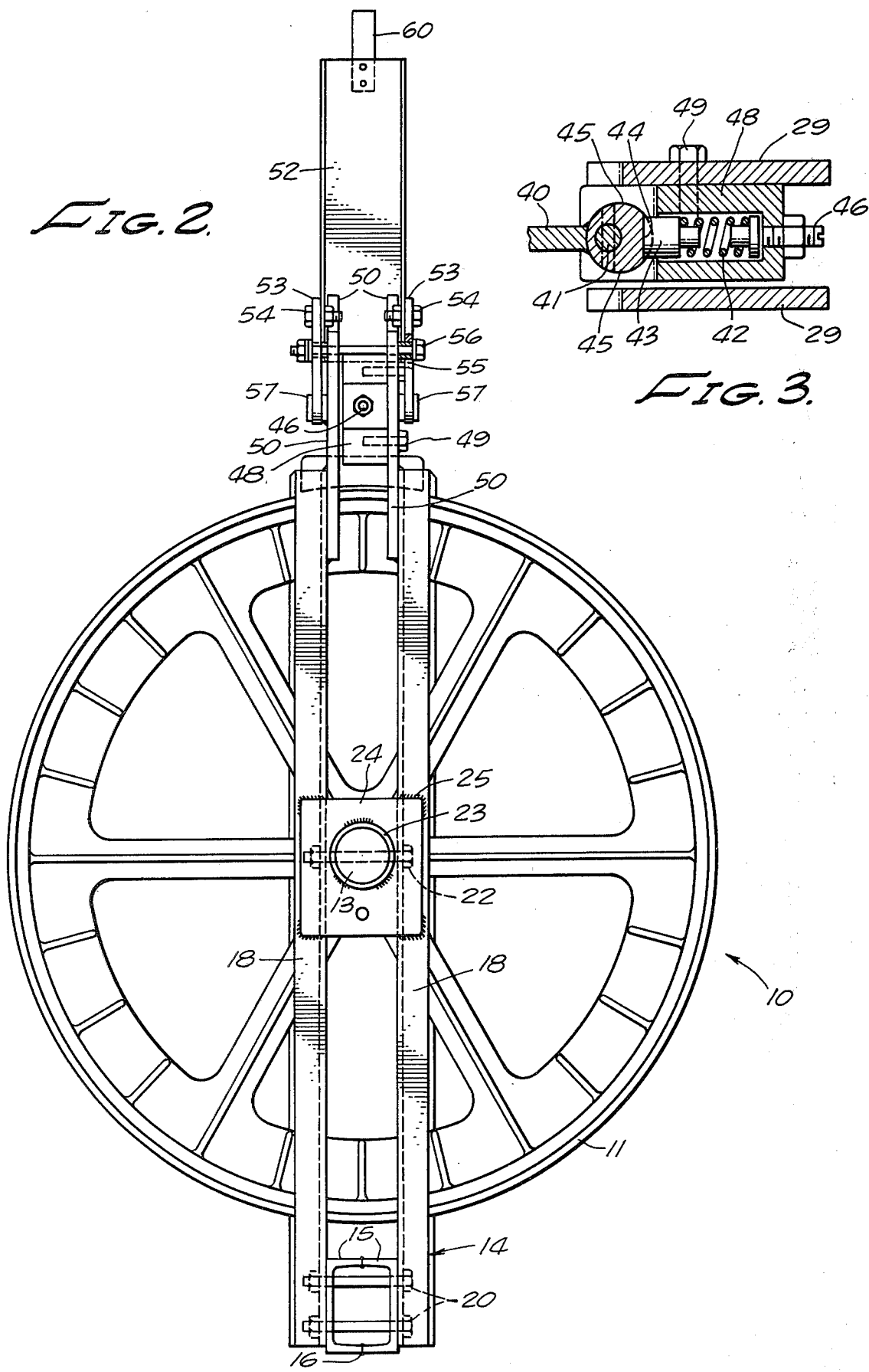

BUNDLE CONDUCTOR STRINGING BLOCK

This invention relates to a stringing block, and more particularly to an improved assembly having a cantilever suspension yoke cooperating with a guide horn and retractable guide members to channel a helicopter dispensed conductor tow-line onto a central sheave.

BACKGROUND OF THE INVENTION

Various proposals have beem made heretofore for a multiple sheave stringing block useful in the installation of bundle type power conductors along a power line and including provision for threading the blocks with a helicopter dispensed tow-line. The use of helicopters for the the threading operation requires suitable provision for introducing the two-line into the throat of the stringing block. More pertinent prior teachings known to this applicant and intended to perform this function include: U.S. Pat. Nos. Reilly 3,584,837; Chadwick 3,837,623; Lindsey 3,868,089 Chadwick 3,905,581; Bozeman 4,018,422 and Lindsey 4,129,287. Reilly is typical of blocks employed in stringing bundle conductors and requiring manual threading of individual blocks by a workman laboriously climbing the tower and lowering himself to the throat of each block in order to perform the threading operation by hand. The earlier Chadwick patent discloses a bundle conductor block threadable by helicopter and relies upon a single structural steel side frame to support the three sheaves and employs a tow-line guide member movable to its retracted position in only one direction. Lindsey U.S. Pat. No. 3,868,089 avoids this last mentioned shortcoming of Chadwick but employs heavy duty cast sideframes and a heavy duty load sharing gate which closes across the towline threading passage to distribute the load forces between the two sideframe members after the block is threaded. Chadwick U.S. Pat. No. 3,905,581 provides a helicopter threadable stringing block having a rotary wheel device for transferring the tow-line across the frame while continuously distributing the load forces between the blocks' two sideframes. Bozeman is generally similar in principle but differs structurally from the last mentioned Chadwick patent. The two Lindsey patents are closely related to one another but are readily distinguishable structurally and in principle from this invention.

SUMMARY OF THE INVENTION

This invention avoids the shortcomings and disadvantages of prior stringing block constructions and provides an unusually compact, lightweight, high strength construction economically fabricated from standard structural components. The rugged U-shaped main frame is formed of three pairs of channel members welded together except for the pair forming one sideframe. The three sheaves are mounted on anti-friction bearings supported by a shaft detachably bolted to hub members fixed to the two sideframes. The remaining frame component comprises a cantilever suspension yoke fixed to the top of one sideframe and forming an open-ended tow-line threading passage for discharging a helicopter dispensed tow-line onto the central sheave. This result is aided by a pair of toggle type guide members pivotable in either direction to stable retracted positions clear of the block throat. The block also includes a collapsible guide horn for the tow-line and a normally closed guard gate which opens to pass the tow-line into the block throat and immediately recloses to prevent escape of the tow-line.

Accordingly, it is a primary object of this invention to provide an improved low-cost rugged bundle conductor stringing block having a main frame formed essentially of three pairs of channel members.

Another object of the invention is the provision of an economical lightweight rugged conductor stringing block having a cantilever type suspension yoke adapted to receive a helicopter dispensed tow-line.

Another object of the invention is the provision of an improved low cost, light-weight rugged stringing block for bundle type conductors having a main frame formed in two sub-assemblies one of which comprises one side frame and the other of which comprises a cantilever suspension yoke and a cross frame member rigidly connected to the opposite ends of the other side frame and detachably connected to the lower end of the first mentioned side frame.

These and other more specific objects will appear upon reading the following specification and claims and upon considering in connection therewith the attached drawing to which they relate.

Referring now to the drawing in which a preferred embodiment of the invention is illustrated:

FIG. 1 is an end elevational view of an illustrative embodiment of the stringing block with portions in cross section to show details;

FIG. 2 is a side elevational view from the left hand side of FIG. 1; and

FIG. 3 is a cross sectional view on line 3—3 of FIG. 1.

Referring more particularly to FIGS. 1 and 2, there is shown an illustrative embodiment of a bundle type conductor stringing block designated generally 10 incorporating the principles of this invention. As there shown, the block has three sheaves 11, 11 journalled on anti-friction bearings 12 mounted on a tubular shaft 13 having its opposite ends detachably mounted in the mid length of the side frames of a U-shaped main frame 14. As is best shown in FIG. 2, the lower ends of the side frames are interconnected by a pair of channel members 15, 15 facing toward one another and having the edges of their side flanges welded together by welds 16 and having their ends sandwiched between two pairs of side frame channel members 18, 18. These channels face away from one another so that their web portions lie flush against the webs of channel members 15. The two channels 18 at the right side of the block as viewed in FIG. 1 are preferably larger and stronger than members 18 in the left hand side frame. The right hand side frame is welded to channel members 15 by welds 19 whereas the pair of channels forming the left hand side frame are detachably coupled to channels 15 by bolts 20.

The opposite ends of the sheave shaft 13 are detachably coupled to the midlength of the two side frames by bolts 22. These bolts extend through aligned holes in the webs of channels 18 and through sleeves 23 passing through and welded to mounting plates 24. These plates are secured to the side flanges of channels 18 by welds 25. Sleeves 23 are likewise welded to plates 24 and their inner ends terminate closely adjacent the ball bearings 12 and serve to hold the sheaves 11 out of contact with the adjacent surfaces of the side frames.

The cantilever suspension yoke, designated generally 28, comprises a pair of inverted L-shaped plates 29, 29 having their right hand vertical legs welded to the web portions of the heavier guage right hand side frame. A plurality of bracing strips 30, 30 interconnect the edges of yoke plates 29 and are suitably secured thereto as by welds 31. The horizontal leg of yoke 28 is provided with openings 33 to receive a suspension sling connecting stringing block 10 to the lower end of a power line insulator in a manner well known to those skilled in this art.

The free end of yoke 28 overlies the upper end of the left hand side frame and is spaced therefrom adequately to provide an inlet passage 35 through which the conductor tow-line enters the throat of the stringing block. After entry of the tow-line, the inlet of passage 35 is closed by a guard gate 36 pivotally supported on a pin 37 journalled between the side plates of yoke 28 and spring biased to closed position by a torsion spring.

It is important that the tow-line, not shown, comes to rest on the central one of the sheaves 11. This is assured by a pair of guide members 40, 40 pivotally supported on pins 41 at the upper ends of each of the sideframes. As shown in FIG. 1, guide members 40, 40 lie in a common vertical plane transversely of the throat of the stringing block with their lower ends closely spaced from the rims of the central sheave 11. The guide members are firmly held in this position by separate compression springs 42 having their inner ends urging a cam follower 43 against a flat 44 located between arcuate camming surfaces 45, 45 of guide members 40, 40. The edges of flat 44 merge with pairs of camming surfaces 45 to either side thereof and are effective to hold guides 40 firmly fully retracted clear of the threading throat of the stringing block. Screws 46 bearing against the outer ends of springs 42 are adjustable to vary the effective strength of springs 42 on the cam follower blocks 43. These springs and guides 40, 40 are supported in castings 48 the right hand one of which, as viewed in FIG. 1, is secured to one of the vertical legs of yoke 28 by cap screws 49 and the left hand one of which is secured by cap screws 49 to a casting 50 welded or otherwise securely fixed to the upper end of the left hand side frame.

A tow line guide horn 52 as herein shown is formed from an inverted channel shaped member and is supportable selectively in the upwardly inclined position shown in FIG. 1 or in a non-operating retracted position along the outer side of the left hand side frame. For this purpose, the lower end of the horn is provided with a pair of castings 53 secured thereto by bolts 54. Brackets 53 have slot 55 accommodating a bolt 56 which extends loosely therethrough, Tangs 57 project outwardly from the opposite sides of casting 50 into abutment with the vertical ear of castings 53 when bolt 56 is at the upper end of slots 55 and are then effective to support horn 52 firmly in the upwardly inclined position shown in FIG. 1. When the guide horn is so positioned its uper side merges smoothly with the lower side of the tow-line entrance passage 35. The upper end of the horn is preferably provided with a guard hook 60 to prevent the tow-line from riding upwardly along the horn and off its upper end as might otherwise occur under some operating conditions.

When guide horn 52 is not needed it may be collapsed compactly against the outer side of the block simply by lifting the horn bodily upwardly as permitted by slots 55 until the lower end of brackets 53 can pivot counterclockwise beyond the upper edge of tangs 57.

OPERATION

In use, the stringing blocks are suspended from the lower ends of insulator strings in the usual way. If the blocks are being suspended from a single insulator the suspension shackles are generally connected to the two outer holes 33 whereas, if the blocks are being suspended from the interconnected lower ends of upwardly diverging insulator strings, the suspension shackles are connected to the center hole 33 in the yoke. Guide horn 52 is pivoted upwardly to its stable inclined position shown in FIG. 1 with the downwardly projecting ear of bracket 53 resting against tang 57. The guard gate 36 is also in its normal closed position across the entrance of tow-line passage 35.

The tow-line is advanced along the power line towers by helicopter and is lowered against successive ones of the guide horn 52. The weight of the line carries it downwardly along the horn into passage 35 and past gate 36 following which the gate recloses as the line is directed by guide members 40 on to the top of the center sheave 11. Guide members 40 are held firmly in a common plane transversely by the block throat by the compression springs 42 holding cam followers 43 firmly seated against the flat surfaces 44 of the guide members. The guides remain in this position until displaced by engagement with a running board at the trailing end of the two-line and connecting that line to the leading end of a set of bundle conductors. The running board engages guides 40 as it advances into the throat of the stringing block and pivots the guides through a 90° arc to lie generally parallel with the opposite sides of the stringing block where they are firmly held by springs 42 and cam followers 43.

After the conductors have been strung along the powerline the workmen proceed to transfer the bundle conductors to the insulators after lowering the guidehorn 52 to its collapsed position. This operation is carried out by lifting the horn vertically until the lower end of the vertical ear of brackets 53 clears the top of tangs 57 whereupon the horn can be pivoted about bolt 56 until it lies vertically along the adjacent block side frame. The workmen also open the guard gate 36 to its fully open position where it is retained by leaf spring 30 so as not to interfere with the transfer of the conductors out of the tow-line entrance passage 35. The stringing block may now be detached from the insulator string or strings and lowered from the tower after which the conductors are clamped to the lower end of the insulator string.

While the particular bundle conductor stringing block herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A stringing block adapted to be threaded by helicopter for use in stringing bundle power conductors, said block comprising:
   a U-shaped frame formed of structural metal members including a bight portion formed by a pair of inwardly facing channel members secured together along their facing edges with the ends thereof sandwiched between upright side frames formed by separate pairs of outwardly facing channel members;
   a pair of aligned tubular socket means secured between the midlength portions of said side frames;

a shaft rotatably supporting a plurality of sheaves having its ends seated in and secured to said pair of socket means;

an inverted L-shaped suspension yoke having the lower end of its vertical leg secured to the upper end of one of said side frames and the free end of its horizontal leg extending toward the upper end of the other of said side frames at a level thereabove to provide a passage to receive a tow-line from a helicopter; and guide horn means extending upwardly and outwardly from the lower side of said tow-line passage.

2. A stringing block as defined in claim 1 characterized in the provision of guard gate means movably supported by the horizontal leg of said suspension yoke and movable between a retracted position generally clear of said tow-line passage and an extended position blocking retrograde movement of a tow-line out of said passage.

3. A stringing block as defined in claim 2 characterized in the provision of keeper means for holding said gate means releaseably in said retracted position.

4. A stringing block as defined in claim 1 characterized in that said guide horn means is connected to the upper end of said one side frame by slot and pin means cooperating with stop means on said side frame to support said horn means selectively and firmly in said upwardly outwardly extended position and in a retracted position closely beside said one side frame.

5. A stringing block as defined in claim 1 characterized in that said suspension yoke comprises a pair of parallel L-shaped plates held spaced apart by rigid spacer means welded thereto.

6. A stringing block as defined in claim 1 characterized in the provision of a pair of tow-line guide members mounted one on each of said side frames for swinging movement toward and away from one another, and compression spring means operable to hold said guide members selectively in a common upright plane crosswise of said block and in retracted positions along the outer side of a respective outer one of said said sheaves.

7. A stringing block as defined in claim 1 characterized in that one of said side frames is permanently secured to the bight portion of said U-shaped frame, and means for detachably securing the other of said side frames to said frame.

8. A stringing block for use in stringing bundle power conductors comprising:

a U-shaped main frame supporting a plurality of independently rotatable sheaves on a common shaft between the legs thereof;

the bight portion of said main frame including a pair of channel members facing each other and welded together, said bight portion being sandwiched between and secured to the lower ends of respective pairs of outwardly facing channel members forming the legs of said U-shaped main frame, and said sheaves being journalled on a shaft secured between the mid-length portions of said legs;

a rigid inverted L-shaped suspension yoke fixed to the upper end of one of said legs and having a free end spaced above the upper end of the other of said legs to form a passage for a tow-line when dropped thereinto by a helicopter;

guide horn means extending upwardly and outwardly from the lower edge of the entrance of said tow-line passage; and a pair of tow-line guide members pivotally supported adjacent the upper ends of said main frame legs on upright axes and including spring means between each of said guide members and said main frame and attached to one only thereof, said spring means being operable to hold said guide members selectively in a stable common place transversely of said sheaves and in separate stable planes clear of said tow-line passage.

9. A stringing block as defined in claim 8 characterized in that said guide horn means includes slot and pin means and cooperating stop means operable to support said horn means rigidly in said upwardly inclined position and alternatively in a collapsed retracted position against the adjacent one of said main frame legs.

10. A stringing block as defined in claim 8 characterized in that said spring means comprises a compression spring means having one end bearing against said main frame and its other end bearing against a camming surface on the adjacent one of said guide members in an area closely adjacent the pivot axis thereof.

11. A stringing block as defined in claim 10 characterized in the provision of means for adjusting the pressure exerted by said compression spring means on said guide members.

12. A stringing block as defined in claim 8 characterized in that said guide members are pivotable selectively clockwise and counter-clockwise from said common plane extending transversely of said sheaves.

13. A stringing block as defined in claim 8 characterized in that one of said legs is welded to said bight portion and the other one of said legs is detachably secured thereto.

14. A stringing block as defined in claim 1 characterized in that one of said side frames is formed from larger and stronger channel members than the channel members in the other of said side frames.

* * * * *